United States Patent [19]

Kuchar

[11] Patent Number: 4,909,772
[45] Date of Patent: Mar. 20, 1990

[54] CONCAVE FOR USE WITH COMBINE CYLINDER

[76] Inventor: George J. Kuchar, 939 Charles, P.O. Box 595, Carlinville, Ill. 62626

[21] Appl. No.: 314,048

[22] Filed: Feb. 22, 1989

[51] Int. Cl.$^4$ ............................................. A01F 10/18
[52] U.S. Cl. ..................................... 460/71; 460/110
[58] Field of Search .................... 460/32, 71, 108, 110

[56] References Cited

U.S. PATENT DOCUMENTS

| | | |
|---|---|---|
| 3,203,428 | 8/1965 | Ausherman . |
| 3,256,887 | 6/1966 | Ausherman .......................... 460/71 |
| 3,927,679 | 12/1975 | Ausherman .......................... 460/71 |
| 4,796,645 | 1/1989 | Kuchar .................................. 460/71 |

Primary Examiner—William P. Neuder
Attorney, Agent, or Firm—Emrich & Dithmar

[57] ABSTRACT

A rotating cylinder having a plurality of spaced raspbars cooperates with a complementary concave in a combine to separate grain from the leafy portion of the plant. The grate-like concave is disposed below and aft of the cylinder in a closely spaced, arcuate manner. Rotation of the cylinder causes its raspbars to engage the severed portion of the plant introduced between a lower, leading edge of the concave and the cylinder, whereupon the raspbars force the grain through the grate of the concave which retains the leafy portion of the plant which is then displaced aft and upward along the concave to its aft edge. Disposed on the concave's aft edge and along its length is an obliquely angled finger grate which directs the leafy residue onto the bottom of a rotating beater for further aft displacement and removal from the concave/cylinder grain separation stage. The concave includes an increased number of more closely spaced, lengthwise bars to permit slower rotation of the cylinder and improved grain separation. The angled finger grate and relative position of the aft, upper edge of the concave with respect to the rotating beater more efficiently eliminates the leafy residue of the harvested plant and prevents residue backfeed, or recirculation, through the concave/cylinder separation stage.

11 Claims, 3 Drawing Sheets

CONCAVE FOR USE WITH COMBINE CYLINDER

BACKGROUND OF THE INVENTION

This invention relates generally to agricultural combines used in the harvesting of crops and is particularly directed to an improved cylinder/concave combination for separating grain from the leafy portion of the plant.

A combine is an agricultural vehicle used in the harvesting of crops. The combine is typically self-propelled and is comprised of a forward header assembly and an aft drive and processing section. The header assembly typically is substantially wider than the aft portion of the combine and includes a plurality of spaced corn or row crop heads which are adapted for engaging the crops in removing the grain therefrom. The thus removed grain, in combination with crop residue such as husks in the case of corn harvesting, are then automatically delivered to the aft drive and processing portion of the combine. In addition to housing the source of propulsion, such as a diesel engine, and operator controls, the aft portion of the combine also includes a complicated threshing system for further separating the grain from the crop residue and for off-loading the thus separated grain from the combine into a transport vehicle such as a truck. The crop residue is then exhausted from an aft portion of the combine and deposited in the field being harvested.

Combines typically make use of a rotating cylinder in the early stages of grain-crop residue separation. The cylinder is typically oriented horizontally and transversely to the direction of combine travel and is adapted to receive that portion of the crop which is separated from the plant by the forward header assembly. The rotating cylinder operates in cooperation with a fixed concave structure positioned adjacent to and below the cylinder. The cylinder-concave combination operates to separate the grain from the husk or leafy portion of the plant. The cylinder generally includes a first plurality of spaced raspbars around its periphery and extending the length thereof, while the concave includes a second plurality of stationary, spaced bars generally parallel to the raspbars. The crop is directed to the space between the rotating cylinder and the concave and the action of the rotating cylinder upon the crop as it is engaged by both the rotating cylinder and concave causes the grain bearing portion of the plant, i.e., the cob in corn harvesting, to become separated from the remaining portion of the plant, i.e., the leafy portion. The grain is then subjected to additional processing for further separation, while the crop residue is exhausted from the combine.

The grate-like concave includes a large number of slots, or apertures, therein formed by the aforementioned second plurality of stationary, spaced bars and a plurality of concave cross bars extending between forward and aft portions of the concave. Unfortunately, the combine ingests more than just plant material. Rocks, soil and other debris taken in by the combine tend to inhibit the various threshing operations within the combine, reducing the efficiency of the grain separation process and the amount of grain recovered.

While prior art concaves are disposed about a portion of the rotating cylinder, they are not formed in a circular arc about the axis of rotation of the cylinder. These prior art concaves include linear sections disposed adjacent to their forward and trailing edges, with a circular arcuate section disposed intermediate the leading and trailing linear sections. With the outer raspbars of the rotating cylinder displaced in a circular arc, the raspbars closely track in a generally parallel manner only the intermediate, circular portion of the concave. Adjacent to the concave's linear leading and trailing edges, the displacement between the cylinder's raspbars and the concave is greater and varies with the angular position of the raspbar. Those areas adjacent to the leading and trailing edges of the concave thus do not provide the closely spaced relation between concave and cylinder necessary for efficient threshing of the plant material ingested by the combine. The increased spacing between the leading edge of the concave and the cylinder's raspbars also inhibits the raspbars from directing foreign materials taken in by the combine through the concave. This results in clogging of the apertures in the concave adjacent to its leading edge such as by soil or rocks preventing the grain bearing portion of the crop from being directed through these apertures and separated from the leafy portion of the plant.

In order to prevent foreign material from clogging the concave, some combine manufacturers have increased the rotational velocity of the cylinder in an attempt to force the foreign material through the apertures in the forward portion of the concave and to maintain these apertures open. However, increasing the rotational velocity of the cylinder increases the likelihood of damage to the harvested crop. This damage is caused by increased impact forces as the faster cylinder contacts the separated grain and appears as cracking making the grain more susceptible to infestation and deterioration.

Increasing the rotational velocity of the cylinder also causes more of the crop residue, which is displaced along the concave, to be recirculated by the cylinder rather than being discharged from the aft, upper edge of the concave. Backfeeding of the crop residue, or its recirculation about the rotating cylinder, reduces the combine's capacity to separate the grain from the plant residue resulting in reduced recovered yields and greater likelihood of residue clogging of the concave. Finally, operating the cylinder at increased rotational velocities increases the combine's fuel consumption rate and is thus less fuel efficient.

The present invention overcomes he aforementioned limitations of the prior art by providing a concave for use with a rotating cylinder in a combine for separating grain from the leafy portion of the plant, wherein the concave subtends a circular arc about and in closely spaced relation to the rotating cylinder. The concave includes a plurality of closely spaced linear bars extending along its length as well as a plurality of closely spaced curved intermediate bars extending from forward to aft in the concave which, in combination, form a large number of rectangular apertures within the concave. The linear bars are positioned on an inner portion of the concave so that their exposed inner edges may be cut such as by a boring tool to form a circular arc for closely matching the displacement path of the cylinder's outer raspbars. By more closely conforming the configuration and shape of the concave to the circular arc over which the cylinder's raspbars are displaced, backfeeding of the crop residue, clogging of the concave by foreign materials such as soil and rocks, and damage to the grain caused by high speed impact with the cylinder's raspbars are essentially eliminated.

OBJECTS OF THE INVENTION

Accordingly, it is an object of the present invention to provide an improved concave arrangement for more efficiently harvesting grain in a combine having a rotating cylinder.

Another object of the present invention is to provide improved separation of grain from the leafy portion of a plant in a combine.

Yet another object of the present invention is to efficiently separate grain from the leafy portion of a plant in a combine by reducing the rotational speed of the combine's cylinder which also reduces the possibility of damaging the grain such as by cracking.

A further object of the present invention is to more efficiently harvest grain with a combine by eliminating crop residue hang-up and the backfeed of crop residue following separation of the grain from the leafy portion of the plant.

A still further object of the present invention is to more efficiently separate grain from the leafy portion of a plant in a combine permitting the combine to operate faster and to harvest greater yields per acre.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
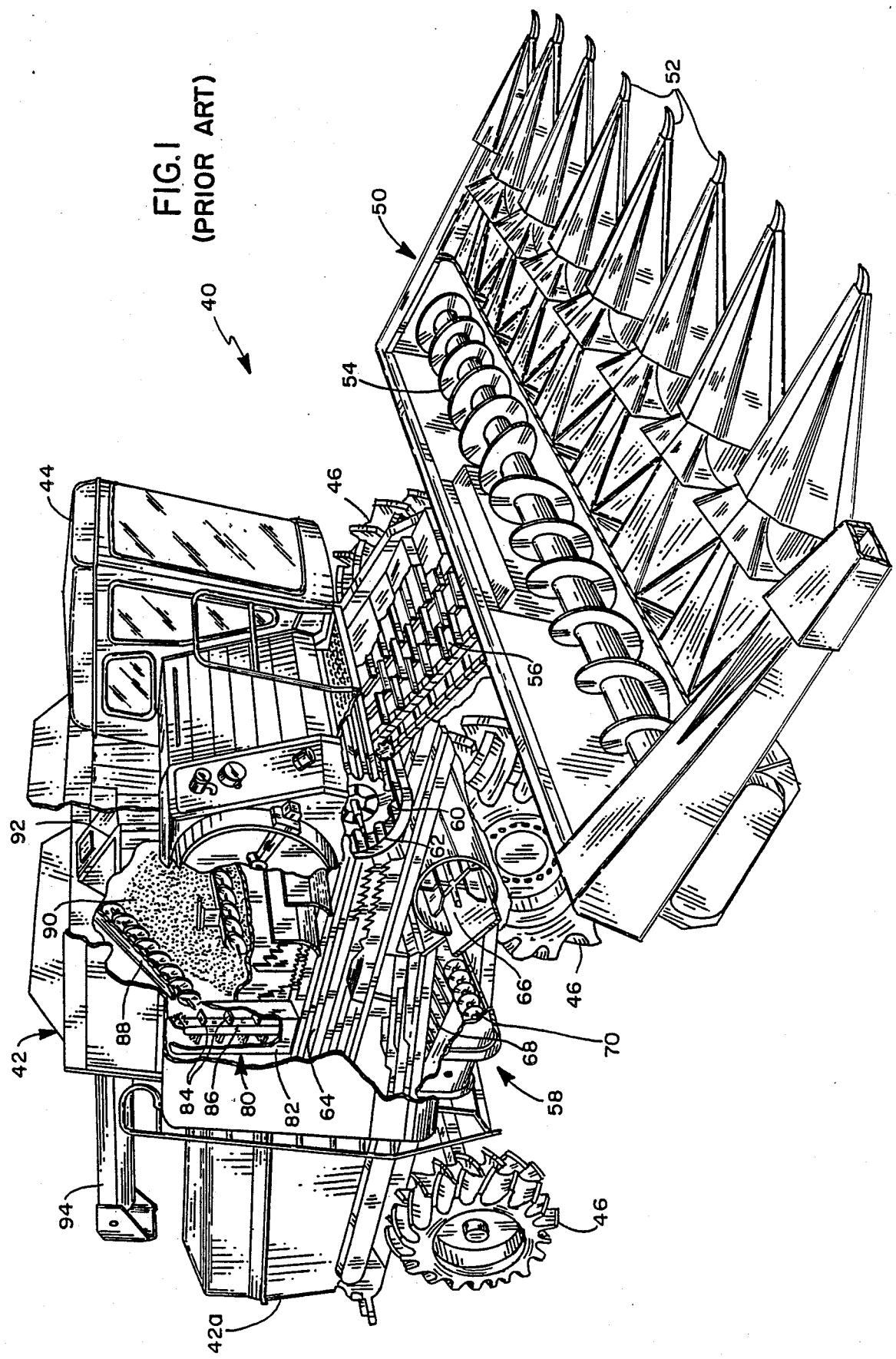
FIG. 1 is a partially cutaway perspective view of a combine illustrating the manner in which the improved concave and cylinder arrangement of the present invention is intended for use in a conventional combine.

Referring to FIG. 1, there is shown a partially cutaway perspective view of a typical combine 40 which incorporates a prior art cylinder and concave arrangement. The combine 40 is comprised primarily of an aft separator/drive section 42 and a forward header assembly 50 attached to a forward portion of the separator/drive section. The separator/drive section 42 includes a cab 44 in which an operator sits and in which are positioned various operating controls for the combine. The separator/drive section 42 effects separation of the grain from the crop residue and includes a plurality of wheels 46 as well as a means for propulsion (typically a diesel engine which is not shown for simplicity) for moving the combine 40 through a field in harvesting the crops. The separator/drive section 42 includes an aft or exhaust end 42a from which the crop residue, after the grain is separated therefrom, is exhausted from the combine 40 and deposited in the field being harvested.

The header assembly 50 mounted to a forward portion of the separator/drive section 42 is wider than the separator/drive section and includes a plurality of head units extending along the length thereof, such as the corn heads 52 illustrated in FIG. 1. The header assembly 50 may also be provided with a plurality of spaced row crop heads along the length thereof for harvesting soybeans, wheat, milo or rice. The corn heads 52 are adapted to separate and remove the ears of corn from the plant stalk. The grain and the plant residue are then delivered to an aft portion of the header assembly 50 and are directed to the center thereof by means of a left- and right-hand spiraled auger 54. From the center, aft portion of the header assembly 50, the grain and residue mixture is delivered to a feeder house 56 which transports the mixture via a conveyor to the combination of a rotating cylinder drum 60 and a concave screen 62. The cylinder drum 60 includes a plurality of spaced raspbars extending along the length and spaced around the periphery thereof. Rotation of the cylinder drum 60 causes the raspbars to engage the corn husks and separate the cob from the leafy portion of the plant. A beater assembly, which is not shown in the figure, is typically positioned immediately aft of the cylinder drum 60 and concave screen 62 combination for further carrying out the separation process. The beater assembly deposits the reduced mixture upon an elongated walker assembly 64 which is comprised of a plurality of vibrating sieves. The separated grain is allowed to fall through the vibrating sieves of the walker assembly 64, while the unwanted plant residue is retained on an upper portion of the walker assembly and displaced toward the rear of the combine. The thus separated grain which falls through the vibrating sieves of the walker assembly 64 is deposited upon a cleaning shoe 68 positioned below the walker assembly and comprised of a grate structure for further separating the grain from any crop residue remaining in the mixture. As the grain and residue mixture falls upon the cleaning shoe 68, a blower 66 directs an air stream on the falling mixture to remove chaff therefrom. The chaff and other crop residue removed from the mixture in the earlier separation steps are discharged from the aft or exhaust end 42a of the combine 40. The thus cleaned grain collects in a lower portion of the separator section 58 of the combine and is laterally displaced by means of a rotating clean grain auger 70 to a center portion of the combine.

The clean grain auger 70 is coupled to and continuous with a generally vertically oriented grain elevator 80. The grain elevator 80 includes a housing 82 within which is positioned a plurality of paddles 84 attached to a moving endless chain 86. The grain elevator 80 lifts individual portions of grain upward where the grain 90 is then displaced by a loading auger 88 into a storage bin or tank 92. One end of an off-loading grain drill 94 may be positioned within the storage tank 92 for removing the grain positioned therein from the combine 40.

Figure 2:
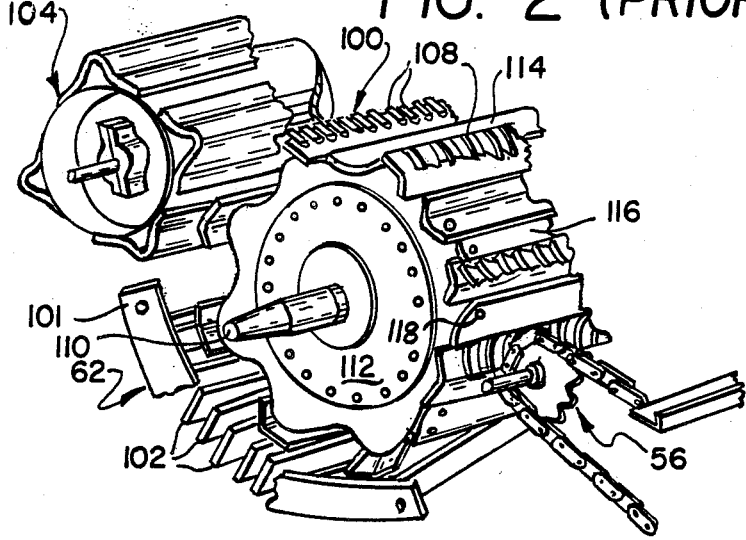
FIG. 2 is a perspective view showing the general arrangement of a concave, a cylinder, a beater, and a conveyor arrangement such as employed in a typical prior art combine.

Referring to FIG. 2, there is shown a perspective view illustrating greater details of a prior art arrangement of a feeder house 56, a concave 62, a rotating cylinder 100, a rotating beater 104, and an upper auger 106. The cylinder 100 is positioned in closely spaced relation to the concave 62 which is disposed immediately below the cylinder and comprised of a pair of curved end brackets 101 (only one of which is shown in FIG. 2 for simplicity) and a plurality of spaced bars 102 extending along the length thereof. The concave 62 further includes a plurality of spaced, curved members disposed along its length which are also not shown in the view of FIG. 2. As previously described, the combination of the rotating cylinder 100 and the concave 62 effects separation of the grain from the leafy, or husk, portion of the plant. Disposed immediately forward of the cylinder 100 is a conveyor-type feeder assembly 56 which delivers the crop directly between the cylinder and the open-mouth concave 62 as the cylinder rotates in the direction of the arrow in FIG. 2. Disposed immediately aft of the cylinder 100 is a rotating beater assembly 104 which displaces the crop material and unseparated grain from the cylinder/concave combination for further separation processing. An upper auger 106 disposed above and slightly forward of the cylinder 100 returns unthreshed grain which reaches the back of the cleaning area to the cylinder area for another pass between the cylinder and the concave 62.

The cylinder 100 shown in FIG. 2 is disclosed and claimed in Applicant's U.S. Pat. No. 4,796,645, issued Jan. 10, 1989. The present invention is not limited to use with this particular cylinder, but will operate with virtually any type of rotating cylinder intended for use in a combine. The cylinder 100 includes a plurality of hubs, or spiders, 112 disposed in a spaced manner along the length thereof and coupled by means of an axle, or support shaft, 110 inserted through a center of each of the hubs. Each of the hubs 112 includes a plurality of spaced, upraised peripheral portions upon which are mounted raspbars 108 which extend substantially the entire length of the cylinder 100. Each of the raspbars 108 is securely mounted to an upraised peripheral portion of each of the hubs 112 in a spaced manner by conventional means such as mounting bolts or the combination of a mounting bracket and a bolt, which are not shown for simplicity.

Positioned immediately adjacent to and attached to each of the raspbars 108 along the length thereof is a respective spacer or filler plate 114. Each of the filler plates 114 extends over a portion of the gap or space between adjacent raspbars 108 and is disposed over substantially the entire length of the cylinder 100 and has a curved cross section. The filler plates 114 may be securely coupled to each of the hubs 112 by conventional means such as bolts 118.

Figure 3:
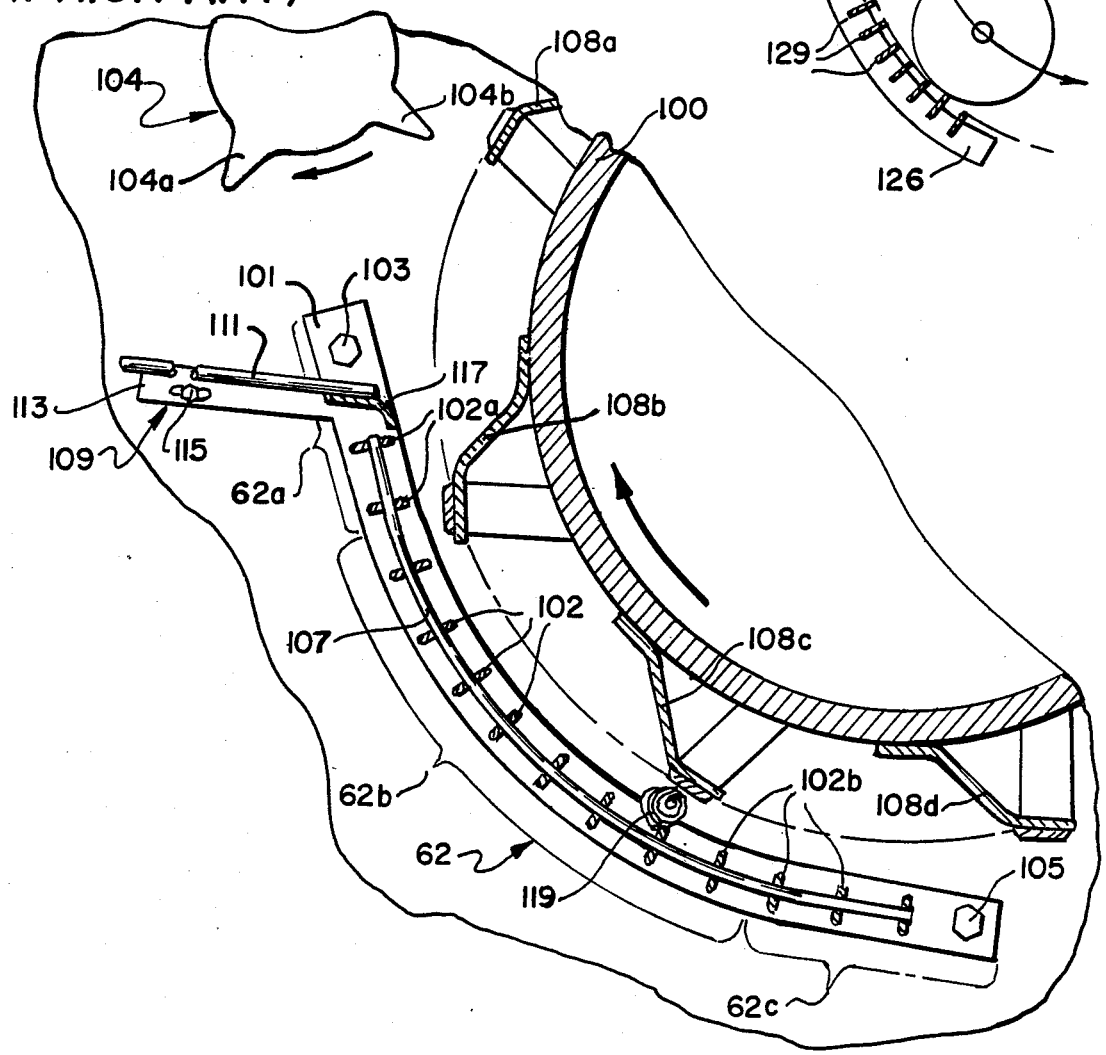
FIG. 3 is a sectional view of a prior art arrangement of a concave, a cylinder, and a beater used for separating the grain-bearing portion of a plant from its leafy residue in a typical combine.

Referring to FIG. 3, there is shown a sectional view of a portion of the prior art concave 62, rotating cylinder 100, and rotating beater 104 arrangement. As previously described, the rotating cylinder 100 includes a plurality of spaced raspbars disposed about its periphery, although only four raspbars 108a through 108d are shown in the figure for simplicity. The rotating beater 104 similarly includes a plurality of spaced wings, or extensions, 104a and 104b disposed about its periphery and extending the length thereof. The cylinder 100 as well as the beater 104 each rotate in a clockwise direction as shown by the direction of the arrows in the figure. The harvested portion of the plant including the grain and leafy portion is directed onto the lower, leading edge of the concave 62 by the combination of the rotating cylinder 100 and the previously described feeder house which is not shown in the figure. When engaged by the concave 62 as well as the raspbars disposed about the rotating cylinder 100, the grain bearing portion of the plant, such as the corncob 119 shown in the figure, is urged between the grate-like structure of the concave in a downward direction. The leafy residue of the plant is displaced rearward and upward along the upper surface of the concave 62 by the rotating raspbars of the cylinder 100. As the leafy residue arrives at the upper edge of the concave 62, it is positioned in the vicinity of the rotating beater 104 which then displaces the leafy residue rearwardly over a short flat finger grate 109. The finger grate 109 is positioned adjacent to the upper, aft edge of the concave 62 for supporting the leafy residue and maintaining it in position for rearward displacement by the rotating beater 104. After exiting the concave, cylinder, and beater assembly, the leafy residue is then further processed for the removal of additional grain therefrom and discharge from the combine.

The concave 62 includes a pair of curved brackets 101 on each end thereof. Each of the curved end brackets 101 is securely attached to a respective inner wall of the combine by means of an upper mounting bolt 103 and a lower mounting bolt 105. Extending between and mounted to each of the curved end brackets 101 are a plurality of linear, spaced crossbars 102. Each of the crossbars 102 is further coupled to a plurality of spaced, curved intermediate bars 107 along the respective lengths thereof. The combination of the crossbars 102 and curved intermediate bars 107 forms a grate-like structure having a plurality of generally rectangular-shaped apertures therein.

As shown in the figure, the curved end brackets 101 and curved intermediate bars 107 are not formed in a true circular arc. Only portions of each of the curved end brackets 101 and intermediate bars 107 are formed in a circular arc. Thus, the concave 62 includes an upper generally linear portion 62a, a lower generally linear portion 62c, and an intermediate circular portion 62b. Because only the intermediate portion 62b of the concave 62 is formed in a circular arc about the rotating cylinder 100, the cylinder's raspbars 108a, 108b, 108c, and 108d are displaced in a closely spaced, generally parallel path only along this portion of the concave. The displacement between the cylinder's raspbars and the upper end portion 62a and lower end portion 62c of the concave 62 is greater than the close spacing between the raspbars and the intermediate portion 62b of the concave. In addition, the cylinder's raspbars travel in a path into, or toward, the concave 62 adjacent to the lower portion 62c thereof. Because the spacing between the cylinder's raspbars and the concave 62 is not fixed, but varies, along these portions of the concave, reduced separation of the grain and leafy residue of the plant occurs in these areas of the concave. In addition, the movement of the cylinder's raspbars into, or toward, the concave 62 adjacent to the lower end thereof causes compressive forces to be applied to the grain resulting in grain damage and clogging of the lower, leading edge of the concave with foreign debris such as rocks and soil. Thus, the gaps between the three lowermost crossbars 102b become clogged by foreign matter, preventing the passage of the separated grain-bearing portion of the plant therethrough. The uppermost crossbars 102a are ineffective in the grain separation process because of their greater displacement from the rotating raspbars.

As shown in FIG. 3, a flat finger grate 109 is disposed adjacent to the upper end of the concave 62. The flat finger grate 109 includes a plurality of spaced, elongated bars 111 extending rearward from the concave 62. The bars 111 are disposed in a spaced manner along the length of the concave 62, with their proximal ends mounted to a filler plate 117 by conventional means such as weldments. A crossbar extends between each adjacent pair of bars 111 to form the finger grate 109. Each end of the filler plate 117, which also extends along the length of the concave 62, is securely coupled to a respective mounting bracket 113. Each of the mounting brackets 113 is attached to an adjacent inner wall of the combine by means of a respective mounting pin 115. As the leafy crop residue is displaced upward by the cylinder's rotating raspbars, the finger grate 109 is intended to provide support for the crop residue as it is displaced rearward by the wings 104a, 104b of the rotating beater 104. However, because the upper end of prior art concaves 62 as well as the finger grate 109 attached thereto are disposed directly beneath the rotating beater 104, the crop residue is displaced to a location directly below and slightly forward of the beater resulting in some of the residue being displaced forward of the beater and continuing around the rotating cylinder 100. This is known as residue "backfeed" and results in the residue being recirculated around the rotating cylinder 100 so as to increase the likelihood of the residue clogging the concave 62 during its second pass, a reduction in the rate at which the harvested plants can be processed for grain separation within the concave-cylinder combination, and imposition of a greater load on the rotating cylinder. In an effort to compensate for this increased load, some prior art combines have increased the rotational velocity of the cylinder but this has led to increased impact damage to the grain.

Figure 6:
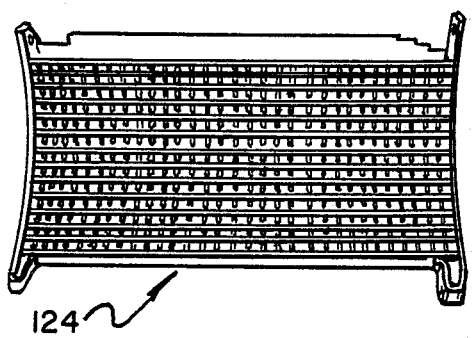
FIG. 6 is a front plan view of the concave of the present invention.
Figure 4:
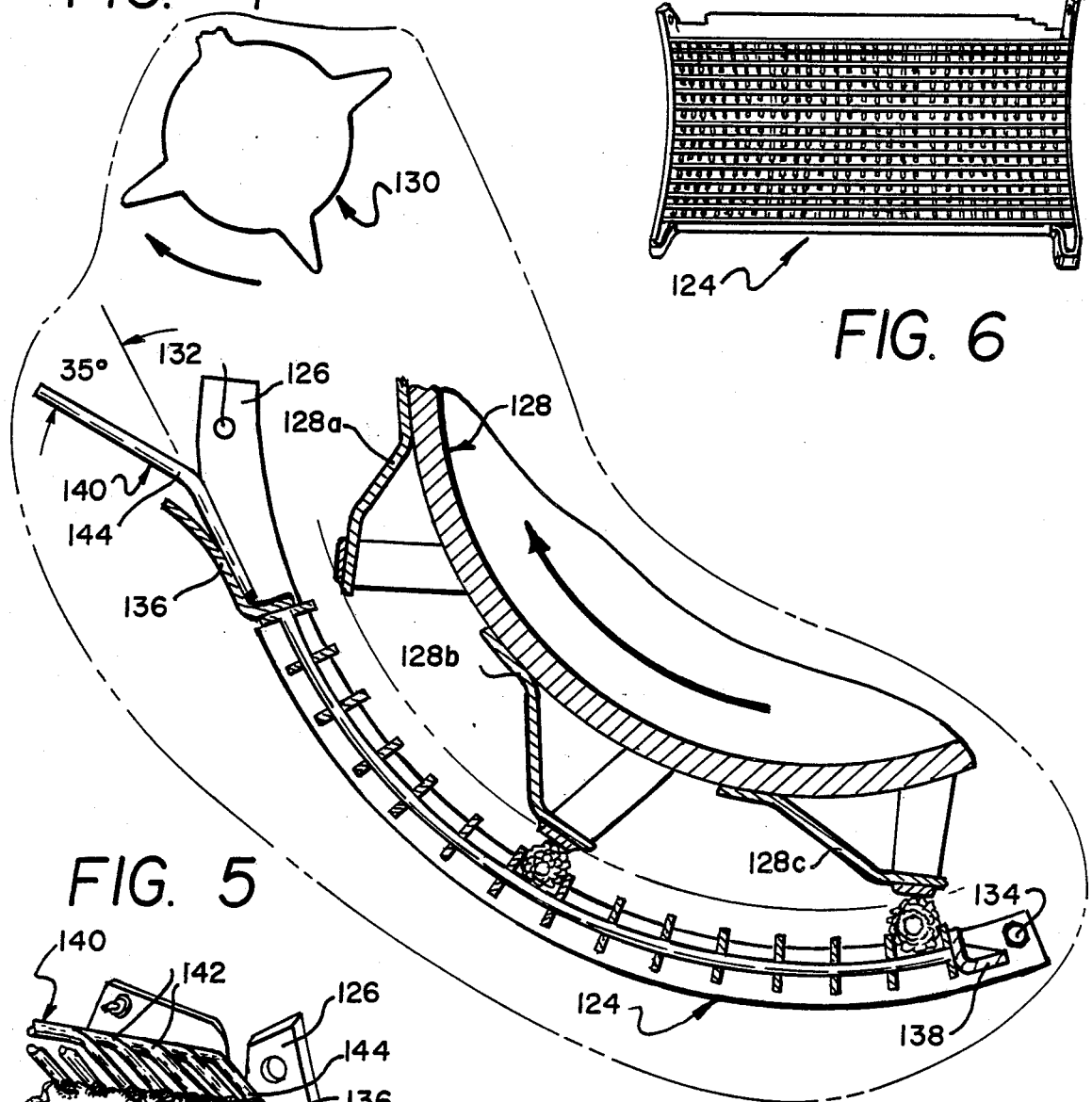
FIG. 4 is a sectional view of a concave, a cylinder, and a beater arrangement in accordance with the principles of the present invention.
Figure 5:
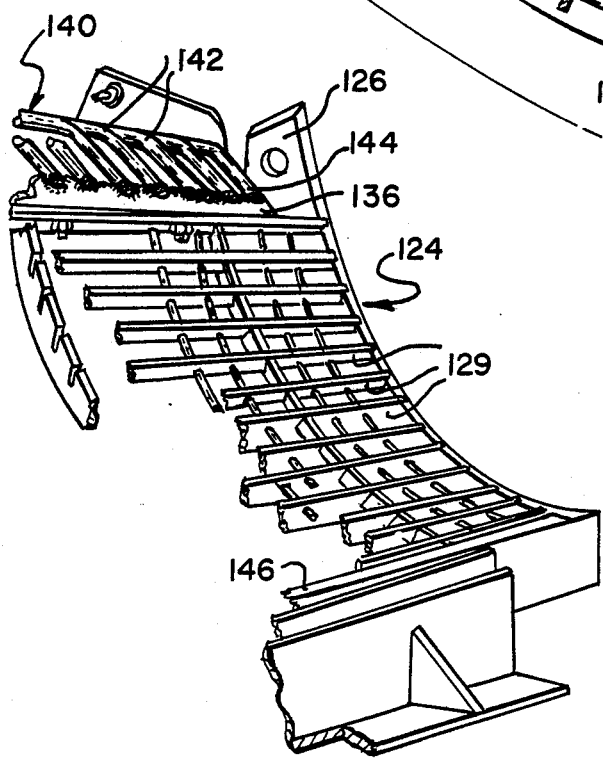
FIG. 5 is a perspective view of a portion of a concave in accordance with the present invention.

Referring to FIGS. 4 and 5, there are respectively shown lateral sectional and partial perspective views of a concave 124 in accordance with the principles of the present invention. A front plan view of the concave 124 is shown in FIG. 6. The concave 124 includes a pair of curved end brackets 125 and a plurality of linear, elongated crossbars 129 extending therebetween. Coupled to and extending through the plurality of crossbars 129 are a plurality of curved intermediate bars 127. The curved intermediate bars 127 are arranged in a spaced manner between the two curved end brackets 125 and along the crossbars 129. Each of the curved end brackets 125 and intermediate bars 127 is shaped in the form of a circular arc over the full length thereof. Thus, the concave 124 is disposed in closely spaced, parallel relation to the rotating raspbars 128a, 128b and 128c of the cylinder 126. The upper edges of each of the crossbars 129 are similarly disposed in closely spaced relation and at the same distance from the displacement path of the rotating cylinder's raspbars. Also in accordance with the present invention, the upper edges of each of the crossbars 129 extends above the upper edges of the curved intermediate bars 127 as well as above the upper edges of each of the curved end brackets 125. The fixed separation distance between the upper edge of each of the crossbars 129 and the rotating cylinder's raspbars as they are rotationally displaced along the concave 124 can be seen in the sectional view of FIG. 4. This fixed, close spacing between the rotationally displaced raspbars 128a, 128b and 128c of the rotating cylinder 126 and the concave's crossbars 129 extends over the entire width of the concave 124 from its leading to its trailing edge for separating the grain bearing portion of the plant from its leafy residue.

The circular arc cross section of the concave 124 and the close, fixed spacing between the concave's crossbars 129 and the rotationally displaced raspbars allows an increased number of crossbars to be positioned in close proximity to the rotating cylinder. Thus, the present invention makes use of fifteen (15) crossbars, while prior art concaves employ fewer crossbars, e.g., typically thirteen (13) crossbars. In fact, from FIG. 3 it can be seen that the prior art concave makes use of less than all of its thirteen (13) crossbars because the three (3) lowermost crossbars disposed on the leading linear portion of the concave and the two (2) uppermost crossbars disposed on the trailing linear portion of the concave are not in position to effectively cooperate with the cylinder's raspbars for effecting grain separation. Thus, the prior art concave makes use of only eight (8) crossbars in the grain separation operation. The greater number of concave crossbars of the present invention provides improved threshing action and better grain separation. Inter-crossbar spacing in the present invention is on the order of $\frac{7}{8}$ inch, while a spacing of on the order of 1-$\frac{1}{4}$ inch is typically used in the prior art.

Upper and lower mounting bolts 132, 134 securely attach respective ends of each of the curved end brackets 125 to an adjacent, inner wall of the combine (not shown in the figures for simplicity). A lower plate 138 extends between the two curved end brackets 125 and along the length of the concave 124. The lower plate 138 is positioned in contact with the first, or leading, crossbar 129a. A trap 146 is positioned adjacent to the forward edge of the concave 124 for removing foreign matter ingested by the combine such as rocks, soil and trash. The close, fixed spacing between the rotationally displaced raspbars and the forward portion of the concave 124 allows the raspbars to force the grain bearing portion of the harvested crop through the spaces between adjacent crossbars and to maintain these spaces, or inter-crossbar gaps, unclogged.

Disposed adjacent to and in contact with the last, or uppermost, crossbar 129b is a filler plate 136. The filler plate 136 extends the length of the concave 124 and is securely attached at respective ends thereof to the two curved end brackets 125 by conventional means such as weldments. The filler plate 136 extends upward from the last crossbar 129b and is generally L-shaped. The filler plate 136 and the lower plate 138, as well as other components of the concave 124 and cylinder 126 described herein are preferably comprised of high strength, corrosion resistant steel.

Attached to the filler plate 136 by conventional means such as weldments is a finger grate 140. The finger grate 140 extends the length of the concave 124 and is comprised of a plurality of spaced, angled bars 144 and cross members 142 extending therebetween. The combination of the cross members 142 and angled bars 144 provides the finger grate 144 with a plurality of spaced apertures along the length of the upper edge of the concave 124. Each of the bars 144 is bent at an angle of 35° relative to a straight line so as to form an obtuse angle of 145°. The combination of the filler plate 136 and the finger grate 140 provides a continuous support surface for the plant residue from the last crossbar 129 to a location below and aft of the rotating beater 130. Referring back to the prior art arrangement of FIG. 3, a gap between the uppermost crossbar 102a and the filler plate 117 permits the crop residue to collect adjacent to the upper edge of the concave 62 and to inhibit continued upward and rearward displacement of the plant residue and its elimination from the concave and cylinder threshing combination. This source of clogging in the concave-cylinder area is eliminated in the present invention by the filler plate 136 which fills the gap between the last crossbar 129b and the finger grate 140.

The orientation of the angled bars 144 of the finger grate 140 and their close proximity to the last crossbar 129b facilitates upward and rearward displacement of the plant residue by the rotating raspbars. This is in contrast to the configuration and positioning of the prior art finger bars 111 shown in FIG. 3 which do not guide the plant residue to a location below and aft of the rotating beater. In the prior art arrangement of FIG. 3, plant residue is displaced upward by the rotating raspbars and into the rotating beater 104. Some of the plant residue is displaced by the rotating raspbars to a location forward of the rotating beater 104 which is then unable to rearwardly displace this plant residue, resulting in backfeeding of the residue onto the rotating cylinder 100 and its displacement again between the cylinder and concave. The rearward and upward slope of the angled bars 144 of the finger grate 140 of the present invention allows these bars to guide the plant refuse to a location adjacent to a lower, aft portion of the rotating beater 130 which facilitates further aft displacement of the plant residue by the beater and away from the cylinder-concave threshing combination.

Figure 7:
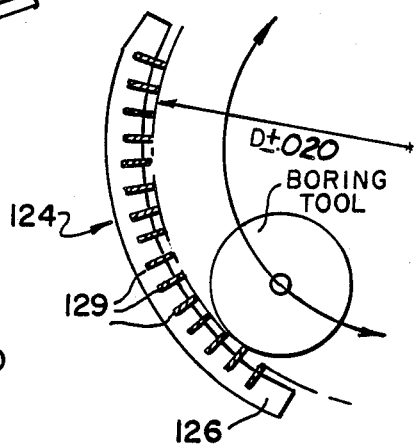
FIG. 7 is a simplified schematic diagram of an arrangement for forming the crossbars of a concave in a true circular arc in accordance with the present invention.

Referring to FIG. 7, there is shown a simplified schematic diagram of an arrangement for providing the concave 124 with a highly circular arcuate shape so as to closely conform with the displacement of the raspbars of the rotating cylinder. In accordance with another aspect of the present invention, each of the crossbars 129 extends above the two curved end brackets 125 as well as above the curved intermediate bars 127. This configuration differs from the prior art arrangement shown in FIG. 3 where the crossbars 102 are shown positioned beneath the upper edges of the curved end brackets 101. By extending the crossbars 129 above the upper edges of the end brackets 125 and intermediate bars 127, the upper edges of the crossbars may be ground by a conventional boring tool 148 so as to form a precise circular arc 150. In a preferred embodiment, the upper edges of the crossbars 129 are bored to a tolerance of within 20/1000 of an inch. This ensures that the circular arc 150 of the concave's crossbars 129 provides close, constant and precise spacing between the rotating cylinder's raspbars and the crop engaging portions of the adjacent concave 124.

There has thus been shown an improved cylinder and concave arrangement for use in a combine for separating the grain bearing and leafy portions of a plant. The precise, circular arcuate shape of the concave's crop engaging members relative to the rotationally displaced cylinder's raspbars permits the full extent of the concave to be used for grain separation, prevents impact damage of the grain by the moving raspbars, eliminates crop residue backfeeding onto the cylinder, and allows the cylinder to rotate more slowly with increased grain recovery and improved fuel efficiency.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a combine, an arrangement for separating grain from the leafy portion of a plant comprising:

a rotating cylinder having a plurality of raspbars disposed in a spaced manner about its periphery and displaced in a circular path;

a rotating beater disposed aft of and above said cylinder;

a grate-like concave having an aft crossbar and a lower leading edge and a higher trailing edge respectively disposed directly below said cylinder and said beater and subtending a circular arc between said edges, wherein said concave is disposed below and aft of said cylinder and in closely spaced, parallel relation thereto and wherein a plant ingested by the combine is directed between the leading edge of said concave and said rotating cylinder with a grain bearing portion of the plant engaged by and forced through an aperture in said concave by a raspbar of said concave and a leafy portion of the plant displaced along said concave toward its trailing edge; and angled guide means including a grate structure having a plurality of bars including an obtuse angle and cross members oriented generally transversely and having apertures therebetween, wherein said grate structure is attached to said concave adjacent to the trailing edge thereof and extends from said aft crossbar to a location adjacent to a lower, aft portion of said beater for directing the leafy portion of a plant from the concave's trailing edge to a lower, aft portion of said beater to facilitate removal of the leafy portion of a plant from the rotating cylinder and concave combination.

2. The arrangement of claim 1 wherein said concave includes a pair of end brackets each subtending a circular arc from a leading to a trailing edge thereof and a first plurality of intermediate bars disposed in a spaced manner between said pair of end brackets and also subtending a circular arc from a leading to a trailing edge thereof.

3. The arrangement of claim 2 wherein said concave further includes a second plurality of elongated, linear, spaced crossbars coupled to and extending above each of said end brackets and said intermediate brackets.

4. The arrangement of claim 3 wherein said concave includes fifteen spaced crossbars.

5. The arrangement of claim 4 wherein the upper edges of said spaced crossbars are disposed to within 20/1000 of an inch of a subtended circular arc.

6. The arrangement of claim 1 further comprising a filler plate disposed between the aft crossbar and said angled guide means for preventing the clogging of a space between the aft crossbar and said angled guide means by the leafy portion of a plant.

7. For use in a combine with a rotating cylinder having a plurality of raspbars mounted in a spaced manner about the periphery of said cylinder for separating grain from the leafy portion of a plant and a rotating beater for discharging the leafy portion of a plant after being separated from the grain, a concave comprising:

first and second end brackets each adapted for mounting to respective facing walls of the combine and including a respective lower leading edge and a higher trailing edge, wherein each of said brackets subtends a circular arc between its leading and trailing edges;

a plurality of linear, elongated crossbars coupled at respective ends thereof to said first and second end brackets, wherein said crossbars are arranged in a spaced manner from the leading edge to the trailing edge of each of said end brackets;

a plurality of curved intermediate bars coupled to said crossbars and arranged in a spaced manner between and parallel to said end brackets, wherein each of said intermediate bars subtends a circular arc between its leading and trailing edges and includes an upper edge extending above said first and second brackets and said crossbars; and angled deflection means extending from and continuous with an aft crossbar of the concave for directing the leafy portion of the plant upward and aft of said concave in preventing the accumulation of the leafy portion between said concave and the rotating cylinder;

wherein the upper edges of each of said intermediate bars mounted in the concave subtend a precisely defined circular arc.

8. The concave of claim 7 including fifteen crossbars.

9. The concave of claim 8 wherein the spacing between adjacent crossbars is on the order of ⅜ inch.

10. The concave of claim 7 wherein said angled deflection means includes a grate structure coupled to an upper, aft edge of the concave for directing the leafy portion of a plant to a location above and aft of the concave following its discharge from the crossbars and curved intermediate bars by the rotating cylinder.

11. The concave of claim 10 wherein said angled deflection means further includes a filler plate disposed between and aft crossbar and said grate structure for preventing accumulation of the leafy portion of a plant therebetween.

* * * * *

UNITED STATES PATENT AND TRADEMARK OFFICE
CERTIFICATE OF CORRECTION

PATENT NO. : 4,909,772
DATED : March 20, 1990
INVENTOR(S) : George J. Kuchar

It is certified that error appears in the above-identified patent and that said Letters Patent is hereby corrected as shown below:

Col. 2 / Line 45: "he" should be --the--.

Signed and Sealed this

Ninth Day of March, 1993

Attest:

STEPHEN G. KUNIN

Attesting Officer

Acting Commissioner of Patents and Trademarks